No. 700,450.  
C. M. SPENCER.  
VEHICLE RUNNING GEAR.  
(Application filed Aug. 31, 1901.)  
Patented May 20, 1902.

(No Model.)  
3 Sheets—Sheet 1.

Witnesses  
C. F. Kilgore  
J. R. Holcomb.

Inventor  
Christopher M. Spencer,  
Harry P. Williams  
Attorney

No. 700,450. Patented May 20, 1902.
C. M. SPENCER.
VEHICLE RUNNING GEAR.
(Application filed Aug. 31, 1901.)

(No Model.) 3 Sheets—Sheet 2.

Witnesses
C. F. Kilgore
V. R. Holcomb.

Inventor
Christopher M. Spencer,
by Harry P. Williams
Attorney

THE NORRIS PETERS CO., PHOTO-LITHO., WASHINGTON, D. C.

No. 700,450. Patented May 20, 1902.
C. M. SPENCER.
VEHICLE RUNNING GEAR.
(Application filed Aug. 31, 1901.)
(No Model.) 3 Sheets—Sheet 3.

Inventor
Christopher M. Spencer
by
Harry P. Williams
Attorney

UNITED STATES PATENT OFFICE.

CHRISTOPHER M. SPENCER, OF WINDSOR, CONNECTICUT.

VEHICLE RUNNING-GEAR.

SPECIFICATION forming part of Letters Patent No. 700,450, dated May 20, 1902.

Application filed August 31, 1901. Serial No. 74,030. (No model.)

*To all whom it may concern:*

Be it known that I, CHRISTOPHER M. SPENCER, a citizen of the United States, residing at Windsor, in the county of Hartford and State of Connecticut, have invented certain new and useful Improvements in Vehicle Running-Gear, of which the following is a specification.

This invention relates to a running-gear for automobiles.

The object is to so arrange and connect the parts of the running-gear that the reaches will be supported directly by the rear axle and indirectly by the front axle on the spring that supports the front end of the body, and thus retain their shape and remain in alinement regardless of the raising or lowering or tipping of the front wheels.

In the embodiment of the invention that is illustrated in the accompanying drawings the reaches project forwardly from the rear axle and terminate just back of the front axle, where they are united by an upwardly-extending yoke that is pivotally connected with the top of the elliptic cross-spring that supports the front end of the body. Flat vertically-yielding brace-bars extend from the reaches back of the middle forwardly to the outer ends of the front axle in such manner that the ends of the front axle and the front ends of the reaches may move vertically independently of each other, but cannot move independently in a horizontal plane either longitudinally or transversely of the running-gear.

Figure 1:
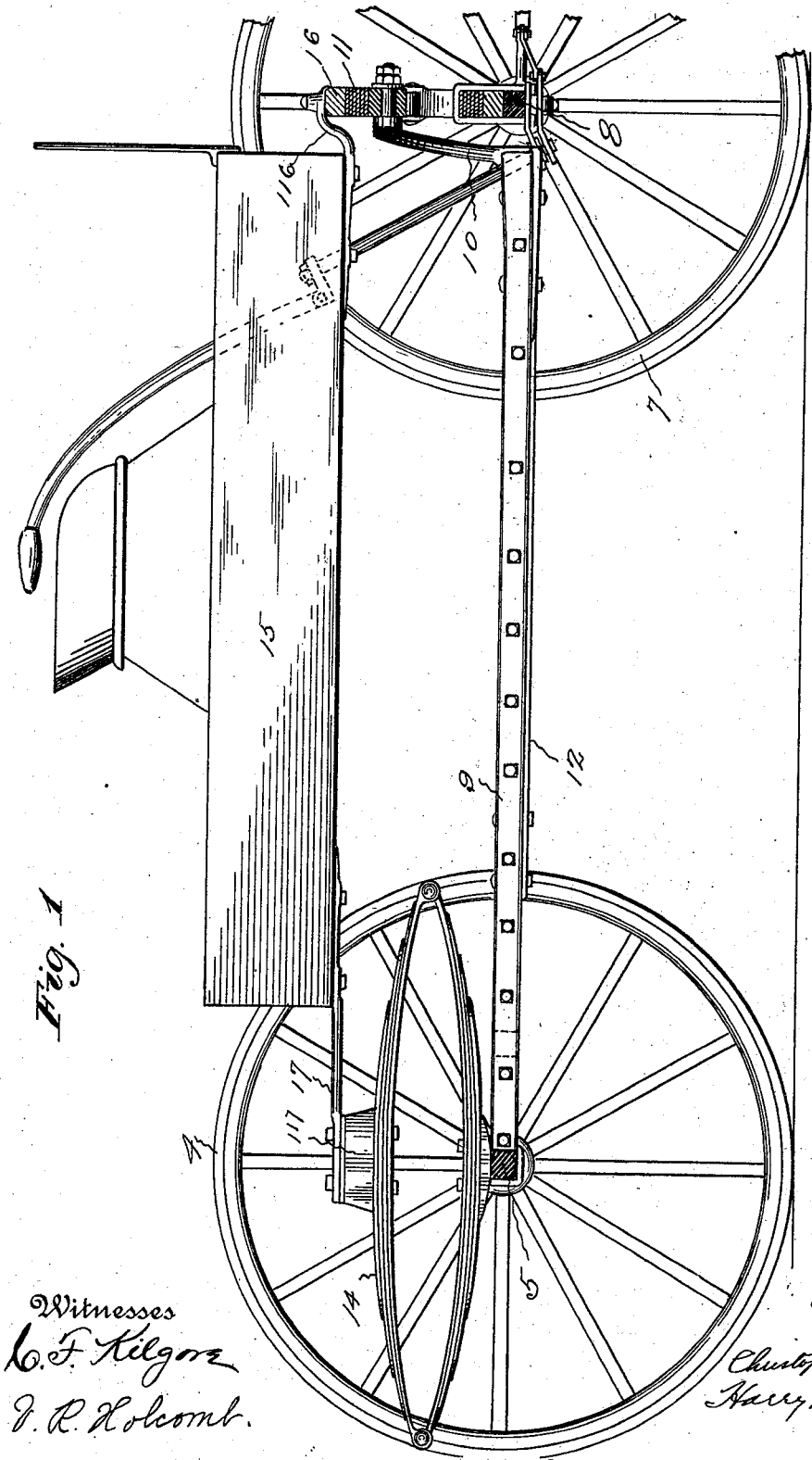
Figure 2:
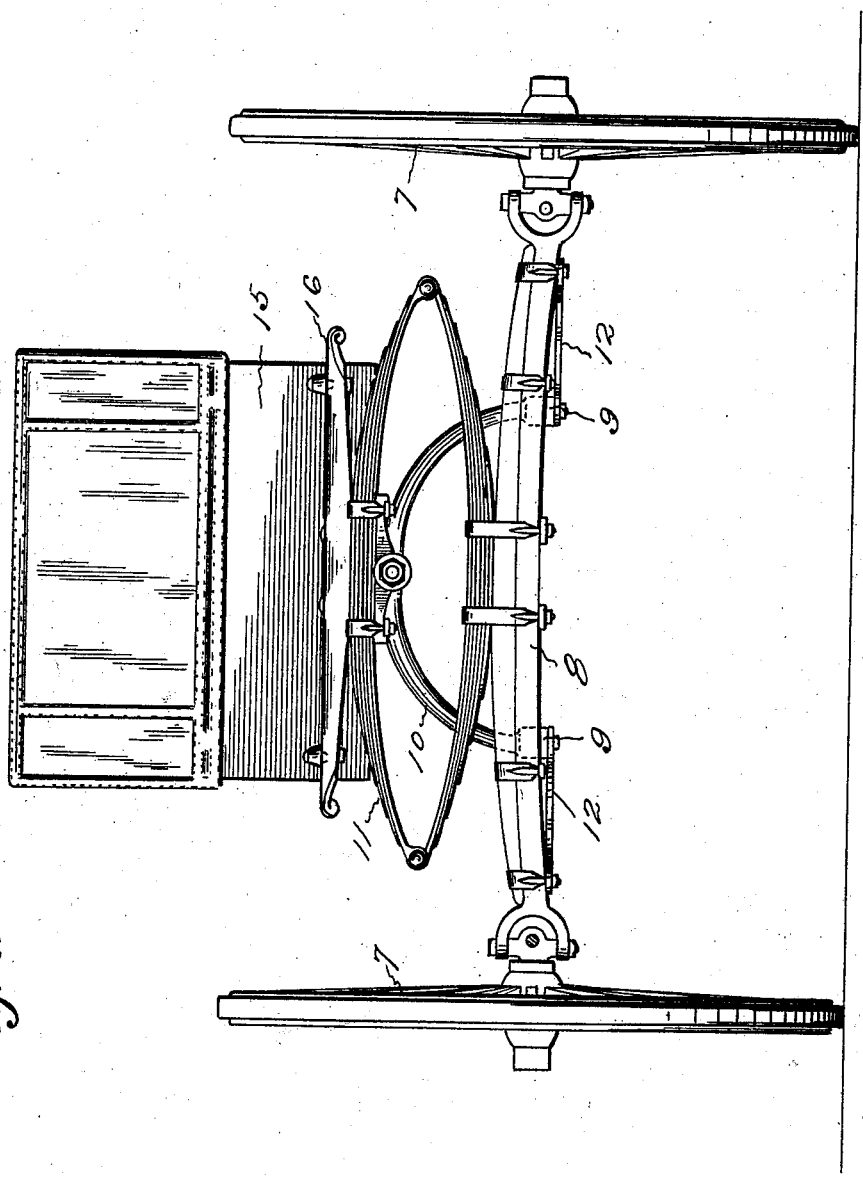
Figure 3:
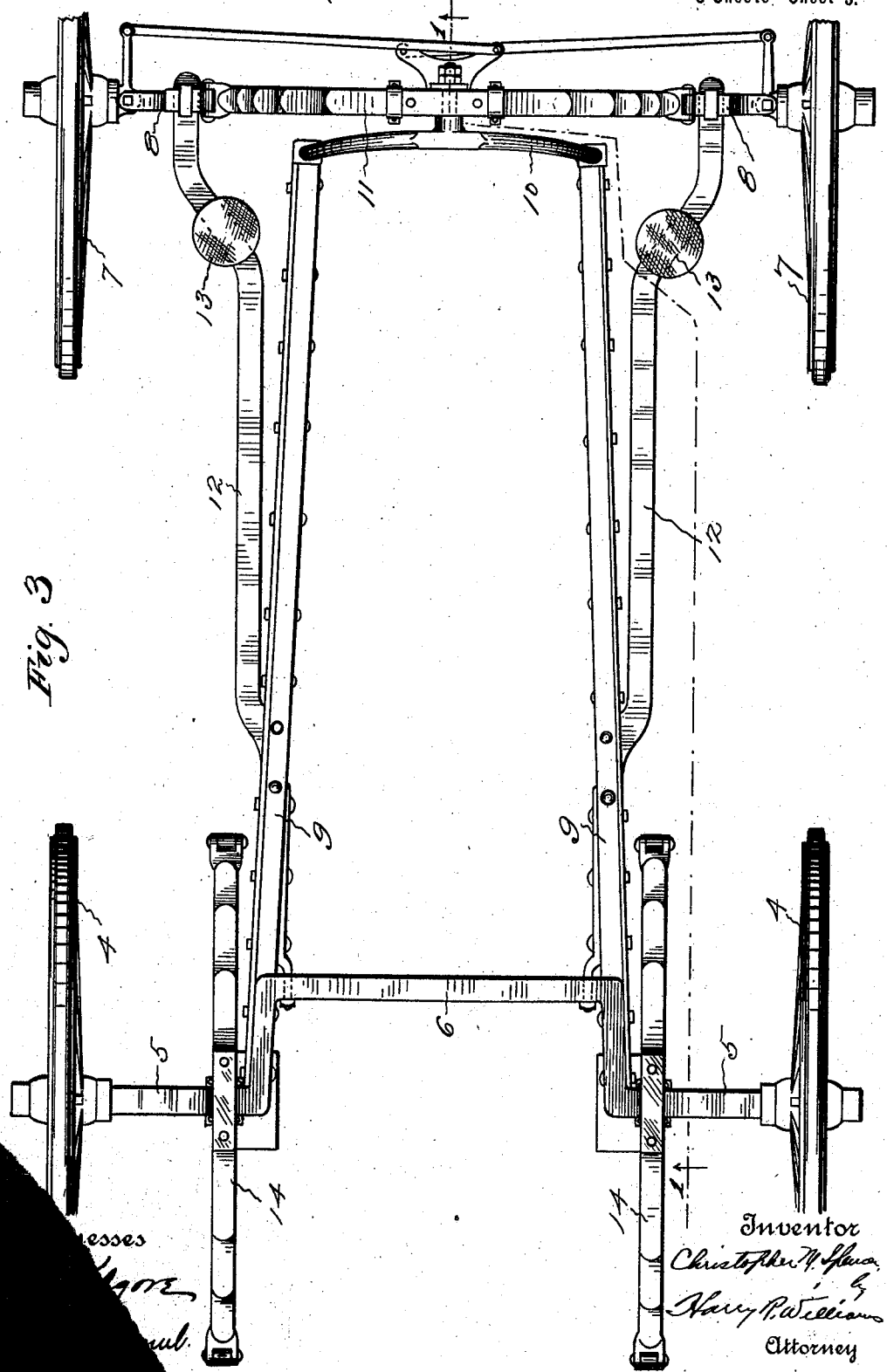

Figure 1 of the views shows a side elevation of a body and a longitudinal section of the running-gear on the plane indicated by the dotted line 1 1 of Fig. 3. Fig. 2 is a front elevation of the same body and gear, and Fig. 3 is a plan of the running-gear.

The rear driving-wheels 4 are mounted upon the rear axle 5 in the usual manner. The axle shown has a section 6, that extends forwardly of the axis of the wheels. This shape of axle permits the hanging of the generator, whether it be steam, gasolene, or storage battery, with its center of gravity substantially coincident with the axis of the wheels.

The steering-wheels 7 are mounted upon short spindles held by yokes at the outer ends of the front axle 8 and are connected with a steering-handle in the usual manner.

Fastened to the rear axle are the reaches 9, that extend forwardly and end just back of the front axle. The front ends of the reaches are connected by an upwardly-extending yoke 10, which is pivoted to a block that is fastened underneath the top of the elliptic cross-spring 11, that supports the front end of the body.

The rear end of each flat steel bar 12 is attached to the under side of a reach back of the middle of the wagon, and the front end of each of these flat steel bars is attached to the under side of the front axle near a steering-wheel yoke. These bars are arranged flatwise, so that they will yield vertically but not horizontally. Steps 13 are attached to these bars. Elliptic side springs 14 are attached to the rear axle.

The body 15, of any design, at its front end is fastened by hanger-irons 116 to a cross-bar 16, mounted upon the cross-spring on the front axle, and at its rear end is fastened by hanger-irons 17 to blocks 117, supported by the side springs on the rear axle. The body is supported by the front elliptic cross-spring and the two rear elliptic side springs. If this running-gear is to be used for a steam-automobile, the generator may be supported by the rear side springs, so that its center of gravity will be substantially coincident with the axis of the driving-wheels, and the motor, water-tank, and fuel-tank may be suspended between the reaches, in which position they will be cushioned by the elasticity of the cross-spring at the front, upon which the reaches and the body are hung. If the running-gear is to be used for an electric vehicle, the storage batteries and motor could be hung from the reaches, so as to be fixed with relation to the axis of the driving-wheels and cushioned by the front spring.

The spring-braces permit the front axle to oscillate with relation to the reaches, which support the weight, as one or the other of the wheels becomes elevated or depressed, and yet the spring-braces prevent the ends of the front axle from moving in a horizontal plane forwardly or backwardly or transversely with relation to the reaches. This construction permits the building of an automobile in which the body is not required to support the weight of driving mechanism, thus leaving it free to carry freight or passengers and to be hung so as to be comfortable for the users. It also permits the generator and motor to be hung low and to have a fixed position with relation to the axis of the driving-wheels and to be so cushioned without the employment of extra springs that they will be relieved of undue jar and vibration without interfering with the free movements of the wheels.

The arrangement of the parts is simple, the running-gear is easily cleaned, and a common generator and motor are readily fastened in position.

I claim as my invention—

1. A running-gear consisting of a rear axle, a fixed front axle, a spring located above and supported by the front axle, reaches extending forwardly from the rear axle and terminating near the front axle, a yoke connecting the front ends of the reaches and supported by the spring on the front axle, and flexible braces extending from the reaches to the outer ends of the front axle, substantially as specified.

2. A running-gear consisting of a rear axle having a forwardly-extending yoke portion, a fixed front axle, a spring located above and supported by the front axle, reaches extending from the rear axle forwardly toward the front axle and terminating near the front axle, a yoke connecting the front ends of the reaches, and supported by the spring on the front axle, and flexible braces extending from the reaches to the outer ends of the front axle, substantially as specified.

3. A running-gear consisting of a rear axle, a fixed front axle, a spring located above and supported by the front axle, reaches extending forwardly from the rear axle and terminating near the front axle, an upwardly-extending yoke connecting the front ends of the reaches, and supported by the spring on the front axle, and flexible braces extending from the reaches to the outer ends of the front axle, substantially as specified.

4. A running-gear consisting of a rear axle, a fixed front axle, springs mounted on the rear axle, a spring located above and supported by the front axle, reaches extending forwardly from the rear axle and terminating near the front axle, an upwardly-extending yoke connecting the front ends of the reaches, a pivotal connection between the yoke and the spring on the front axle, and flexible braces connecting the reaches with the outer ends of the front axle, substantially as specified.

5. A running-gear consisting of a rear axle, a fixed front axle, a spring located above and supported by the front axle, reaches extending forwardly from the rear axle and terminating near the front axle, an upwardly-extending yoke connecting the front ends of the reaches, a pivotal connection between the yoke and the spring on the front axle, and flat bars that yield vertically but not horizontally, connecting the reaches with the outer ends of the front axle, substantially as specified.

6. A vehicle having a rear axle, a fixed front axle, side springs mounted on the rear axle, a cross-spring located above and supported by the front axle, reaches extending forwardly from the rear axle and terminating near the front axle, an upwardly-extending yoke connecting the front ends of the reaches, a pivotal connection between the yoke and the cross-spring, flexible bars connecting the reaches with the outer ends of the front axle, and a body supported at the front end by the cross-spring and at the rear end by the side springs, substantially as specified.

CHRISTOPHER M. SPENCER.

Witnesses:
   H. R. WILLIAMS,
   V. R. HOLCOMB.